United States Patent
Matsumura

(10) Patent No.: US 9,702,710 B2
(45) Date of Patent: Jul. 11, 2017

(54) DRIVING SUPPORT APPARATUS

(71) Applicant: TOYOTA JIDOSHA KABUSHIKI KAISHA, Toyota-shi, Aichi (JP)

(72) Inventor: Takeshi Matsumura, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/509,731

(22) Filed: Oct. 8, 2014

(65) Prior Publication Data

US 2015/0106007 A1    Apr. 16, 2015

(30) Foreign Application Priority Data

Oct. 16, 2013 (JP) ................................ 2013-215423

(51) Int. Cl.
*G01C 21/26* (2006.01)
*B60W 30/14* (2006.01)
*B60W 30/18* (2012.01)

(52) U.S. Cl.
CPC .......... *G01C 21/26* (2013.01); *B60W 30/143* (2013.01); *B60W 30/18109* (2013.01); *B60W 2520/10* (2013.01); *B60W 2540/10* (2013.01); *B60W 2550/402* (2013.01)

(58) Field of Classification Search
CPC ....... G01C 21/26; G05D 1/021; G07C 5/0841
See application file for complete search history.

(56) References Cited

U.S. PATENT DOCUMENTS

| | | |
|---|---|---|
| 5,952,941 A | 9/1999 | Mardirossian |
| 6,138,071 A | 10/2000 | Sekine et al. |
| 6,182,000 B1 | 1/2001 | Ohta et al. |
| 6,188,949 B1 | 2/2001 | Hahn et al. |
| 6,199,001 B1 | 3/2001 | Ohta et al. |
| 7,317,973 B2 | 1/2008 | Dieterle |
| 2004/0210353 A1 | 10/2004 | Rice |
| 2005/0131614 A1 | 6/2005 | Isogai et al. |

(Continued)

FOREIGN PATENT DOCUMENTS

| | | |
|---|---|---|
| DE | 102012004258 A1 | 9/2013 |
| JP | 2005-146966 A | 6/2005 |

(Continued)

OTHER PUBLICATIONS

Communication dated Oct. 8, 2015 from the United States Patent and Trademark Office in counterpart U.S. Appl. No. 14/478,352.

(Continued)

*Primary Examiner* — Yonel Beaulieu
*Assistant Examiner* — Martin Weeks
(74) *Attorney, Agent, or Firm* — Sughrue Mion, PLLC

(57) ABSTRACT

A driving support apparatus 1 performs a driving support based on travel data obtained while a driver causes a vehicle to travel by a driving operation. The apparatus includes storage units 20 and 41 that store a vehicle speed at each position on a traveling route using the vehicle speed acquired when the driver causes the vehicle to travel by performing an acceleration or deceleration operation, and traveling control units 30, 31, and 43 that perform a traveling control based on the vehicle speed at each position stored in the storage units 20 and 41 and the current position of the vehicle. The traveling control units 30, 31, and 43 end the traveling control in a case where the vehicle speed of the vehicle becomes lower than a threshold value during the deceleration by the traveling control.

1 Claim, 10 Drawing Sheets

(56) References Cited

U.S. PATENT DOCUMENTS

| | | |
|---|---|---|
| 2006/0229792 A1 | 10/2006 | Kawazoe et al. |
| 2007/0038364 A1* | 2/2007 | Lee ............... G01C 21/20 |
| | | 701/532 |
| 2009/0043439 A1 | 2/2009 | Barfoot et al. |
| 2011/0313647 A1 | 12/2011 | Koebler et al. |
| 2012/0046803 A1* | 2/2012 | Inou ............... A61B 5/18 |
| | | 701/1 |
| 2012/0078439 A1 | 3/2012 | Tokumochi et al. |
| 2012/0242513 A1 | 9/2012 | Oguchi et al. |
| 2012/0245756 A1 | 9/2012 | Cooprider et al. |
| 2012/0323423 A1* | 12/2012 | Nakamura ........... B60L 11/123 |
| | | 701/22 |
| 2014/0015663 A1 | 1/2014 | Uno |
| 2014/0358406 A1* | 12/2014 | Mori ............... F02N 11/0822 |
| | | 701/112 |
| 2015/0046132 A1 | 2/2015 | Papajewski et al. |
| 2015/0073620 A1 | 3/2015 | Matsumura |
| 2015/0094928 A1 | 4/2015 | Matsumura |
| 2015/0106007 A1 | 4/2015 | Matsumura |

FOREIGN PATENT DOCUMENTS

| | | |
|---|---|---|
| JP | 2005-168174 A | 6/2005 |
| JP | 2007-313925 A | 12/2007 |
| JP | 2007-326465 A | 12/2007 |
| JP | 2009196487 A | 9/2009 |
| JP | 2010-89698 A | 4/2010 |
| JP | 2010-179803 A | 8/2010 |
| JP | 2011112601 A | 6/2011 |
| JP | 2011161949 A | 8/2011 |
| JP | 2012-16987 A | 1/2012 |
| JP | 2012-030744 A | 2/2012 |
| JP | 2012-117938 A | 6/2012 |
| WO | 2013027110 A2 | 2/2013 |
| WO | 2013030927 A1 | 3/2013 |
| WO | 2013/127509 A2 | 9/2013 |

OTHER PUBLICATIONS

Communication, dated Mar. 11, 2016, from the United States Patent and Trademark Office in U.S. Appl. No. 14/478,352.

Communication dated May 5, 2016 from the State Intellectual Property Office of People's Republic of China in Application No. 201410455931.0.

Communication from United States Patent and Trademark Office issued May 15, 2015 in U.S. Appl. No. 14/478,352.

* cited by examiner

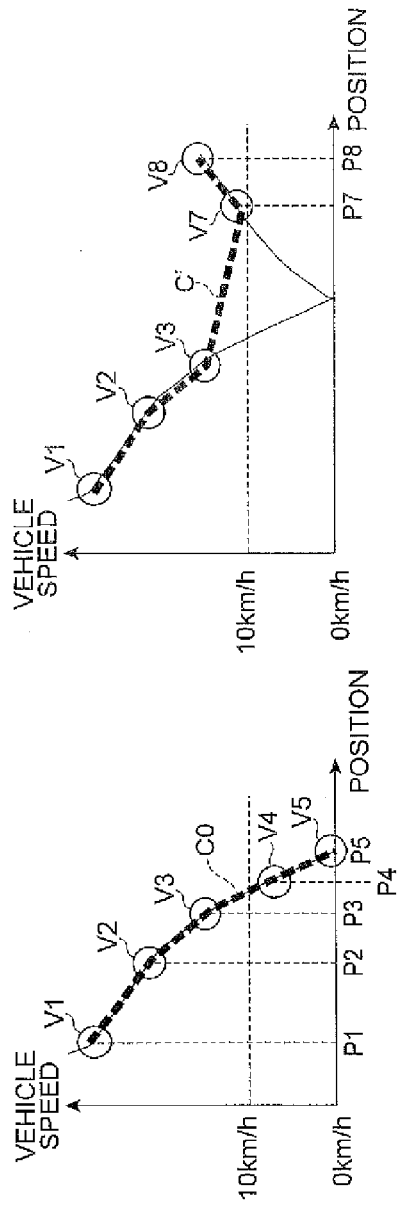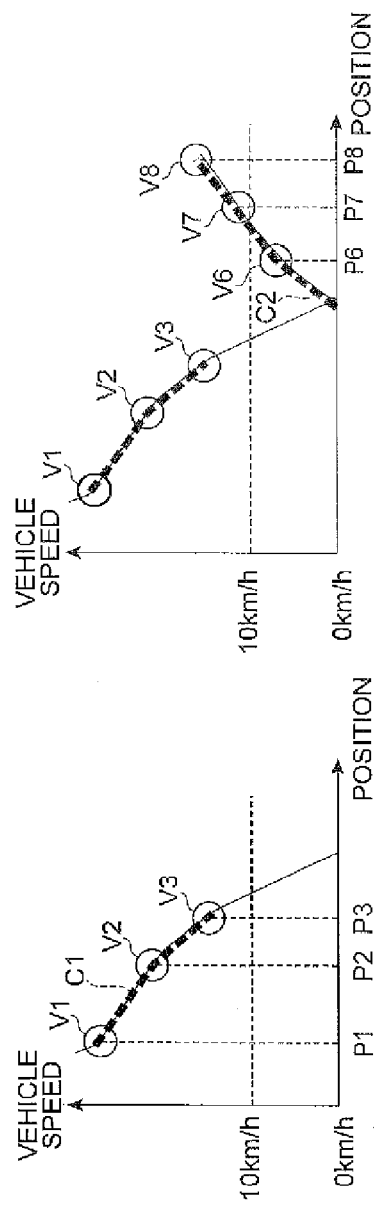

Fig. 7

| | | | | | | |
|---|---|---|---|---|---|---|
| | 0km/h | ~2km/h | ~4km/h | ~6km/h | ~8km/h | ~10km/h |
| AMOUNT OF VEHICLE SPEED CHANGE | +10km/h | +9km/h | +8km/h | +7km/h | +5km/h | +3km/h |
| AMOUNT OF POSITION CHANGE | -5m | -5m | -4m | -3m | -1m | ±0m |

Fig. 8A
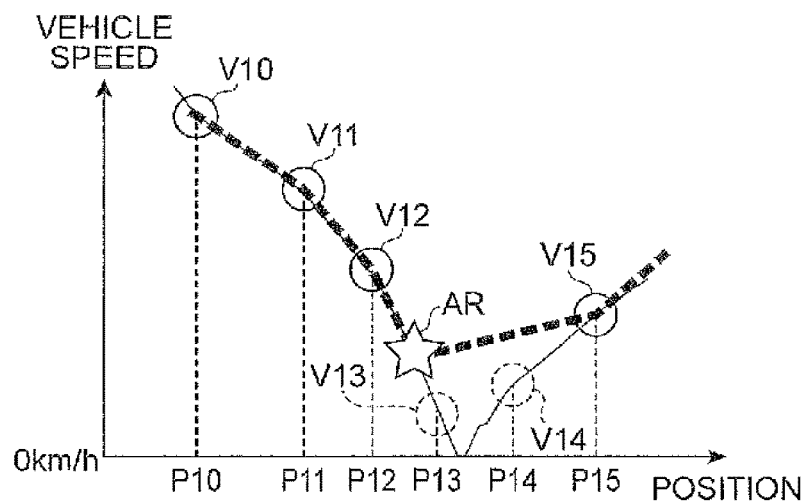
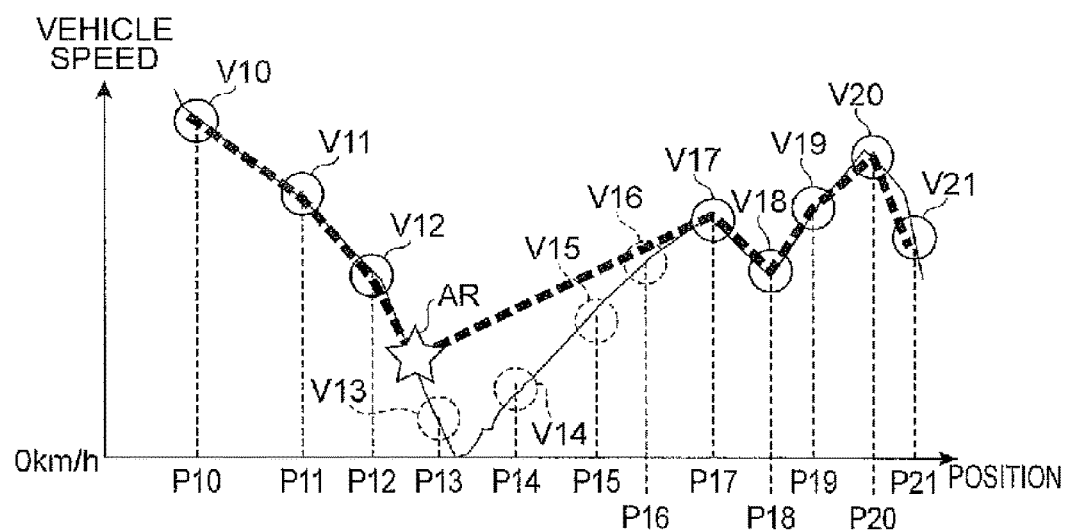
Fig. 8B

DRIVING SUPPORT APPARATUS

BACKGROUND OF THE INVENTION

Field of the Invention

The present invention relates to a driving support apparatus that stores travel data while a driver causes a vehicle to travel by performing a driving operation, and performs a driving support based on the stored travel data.

Related Background Art

Various apparatuses for supporting a driver of a vehicle are developed, and there is an apparatus that performs a driving support such as a traveling control such that a vehicle speed becomes a target vehicle speed. As the target vehicle speed, there is a case where a vehicle speed data is stored while the driver causes the vehicle to travel by performing a driving operation, and the target vehicle speed is set by learning the vehicle speed data. As the driving support in which the vehicle speed data by the driver's driving operation is used, for example, an automatic driving system is disclosed in Patent Literature 1, in which a travel speed at each position of the vehicle is stored while a driver causes a vehicle to travel by performing a driving operation, and when the vehicle is caused to travel by the automatic driving, the vehicle is controlled with the stored vehicle speed as the target vehicle speed at each position.

CITATION LIST

Patent Literature

[Patent Literature 1] Japanese Unexamined Patent Application Publication No. 2010-89698
[Patent Literature 2] Japanese Unexamined Patent Application Publication No. 2012-16987

SUMMARY OF INVENTION

Technical Problem

In a case where a travel speed at each position of a vehicle is stored while the vehicle is caused to travel, the position of the vehicle is generally a position detected by detection means using a Global Positioning System (GPS). In a case of the position detection using the GPS, since there is a detection error, there is a case in which a deviation occurs between the actual current position of the vehicle and the detected position. In a case where a traveling control is performed using the detected position which contains the detection error, if the automatic driving system controls the vehicle such that the vehicle speed becomes the detected speed (target speed) at the detected position stored in the past (target position), a position deviation occurs at the position when the vehicle speed reaches the target vehicle speed. In addition, even in a case where the detected position by the detection means can be obtained with a high accuracy, it is difficult for the automatic driving system to accurately control the two values of the position and the vehicle speed; therefore, there is also a case in which the position deviation occurs due to the traveling control. Particularly, in a case where the target position is a position where the vehicle stops (for example, a position immediately before the stop line), if the position of the vehicle where the vehicle stops by the traveling control is deviated with respect to the target position, the driver can significantly recognize the position deviation and receives an uncomfortable feeling.

Therefore, in this technical field, in a case of performing the traveling control using the travel data of the vehicle by the driver's driving operation, it is desirable to provide a driving support apparatus that can reduce the uncomfortable feeling of the driver.

Solution to Problem

A driving support apparatus according to an aspect of the present invention stores travel data while a driver causes a vehicle to travel by performing a driving operation and performs a driving support based on the stored travel data. The driving support apparatus includes: a storage unit that stores a vehicle speed at each position on a traveling route using the vehicle speed acquired when the driver causes the vehicle to travel by performing an acceleration or deceleration operation; a position acquisition unit that acquires a current position of the vehicle; and a traveling control unit that performs a traveling control based on the vehicle speed at each position stored in the storage unit and the current position of the vehicle acquired by the position acquisition unit. In a case where the vehicle speed of the vehicle becomes lower than a threshold value during the deceleration by the traveling control, the traveling control unit ends the traveling control.

The driving support apparatus ends the traveling control in a case where the vehicle speed of the vehicle becomes lower than a threshold value during the deceleration by the traveling control in the traveling control unit. The threshold value is a low vehicle speed such that the driver may recognize the position deviation with respect to the position of the vehicle by the traveling control. In the driving support apparatus, since the traveling control ends before the vehicle speed becomes low such that the driver may recognize the position deviation, it is possible to avoid the driver's recognition of the position deviation with respect to the position of the vehicle by the traveling control. The driving support apparatus can reduce the uncomfortable feeling of the driver caused by the position deviation by ending the traveling control in a case where the vehicle speed becomes lower than the threshold value. The driving support apparatus can reduce the uncomfortable feeling of the driver caused by the position deviation in a case of stopping the vehicle at the position where the stop position deviation is most easily recognized. In the other case of decelerating the vehicle to an extremely low speed at the position where the opposite side can be foreseen in the blind corner with no center line, or in a case of decelerating the vehicle to an extremely low speed at the position where a cross road can be foreseen in an intersection or a T-junction with no stop line throughout the road, it is also possible to reduce the uncomfortable feeling of the driver caused by the position deviation.

According the aspect, it is preferable that the traveling control unit ends the traveling control before the vehicle reaches a stop position where the vehicle speed stored in the storage unit becomes zero km/h. The speed zero km/h is a vehicle speed when the vehicle stops, and strictly speaking, includes not only zero km/h but also the extremely low vehicle speed (substantially zero km/h) considering the detection accuracy of vehicle speed detection means. The stop position is a position where the vehicle stops, for example, the position immediately before the stop line. In this way, since the vehicle is not stopped at the stop position by the traveling control by ending the traveling control before the vehicle reaches the stop position, the driver does not recognize the position deviation at the stop position where the driver can significantly recognize the deviation.

The driving support apparatus can prevent the uncomfortable feeling of the driver caused by the position deviation at the stop position by ending the traveling control before the vehicle reaches the stop position.

According to the aspect, the driving support apparatus may include an acceleration request detection unit that detects an acceleration request from the driver, and in a case where the acceleration request is detected by the acceleration request detection unit before the vehicle speed of the vehicle becomes lower than the threshold value during the deceleration by the deceleration control, the traveling control unit may perform the traveling control while excluding the vehicle speed lower than the vehicle speed at the time of detecting the acceleration request among the vehicle speed data before and after the stop position stored in the storage unit. In the driving support apparatus, when the acceleration request is received from the driver before the vehicle speed of the vehicle becomes lower than the threshold value, the traveling control is performed based on the high vehicle speed excluding the vehicle speed lower than the vehicle speed at the time of receiving the acceleration request. Therefore, the vehicle can be accelerated to high vehicle speed, and the driver who requests the acceleration does not feel uncomfortable.

Advantageous Effects of Invention

According to the aspect of the present invention, it is possible to reduce the uncomfortable feeling of the driver caused by the position deviation by ending the traveling control in a case where the vehicle speed becomes lower than the threshold value.

BRIEF DESCRIPTION OF THE DRAWINGS

FIG. 2A illustrates an example of travel data when the vehicle temporarily stops and FIG. 2B is a schematic diagram illustrating a stopping state of the vehicle.

FIG. 3A illustrates an example of travel data when the vehicle temporarily stops and FIG. 3B is a schematic diagram illustrating a stopping state of the vehicle.

FIG. 4A illustrates the state when the vehicle stops and FIG. 4B illustrates the state when the vehicle starts.

FIG. 5A to FIG. 5D illustrate an example of changes of the vehicle speed by stored travel data and a traveling control. FIG. 5A illustrates a case of performing the traveling control until the vehicle stops, FIG. 5B illustrates a case of ending the traveling control before the vehicle stops, FIG. 5C illustrates a case of performing the traveling control that the driver did not intend, and FIG. 5D illustrates a case of performing the traveling control that the driver intended.

FIG. 7 illustrates an example of a conversion map of an amount of vehicle speed change to a target vehicle speed corresponding to a speed used in the traveling control unit in FIG. 1 and an amount of position change to a target position.

FIG. 8A and FIG. 8B illustrate an example of changes of the vehicle speed by the stored travel data and the traveling control in a case of acceleration during the deceleration. FIG. 8A illustrates a case where a vehicle speed of the next acceleration becomes a target vehicle speed, and FIG. 8B illustrates a case where a vehicle speed of a nearest maximum point becomes a target vehicle speed.

DESCRIPTION OF THE PREFERRED EMBODIMENTS

Figure 1:
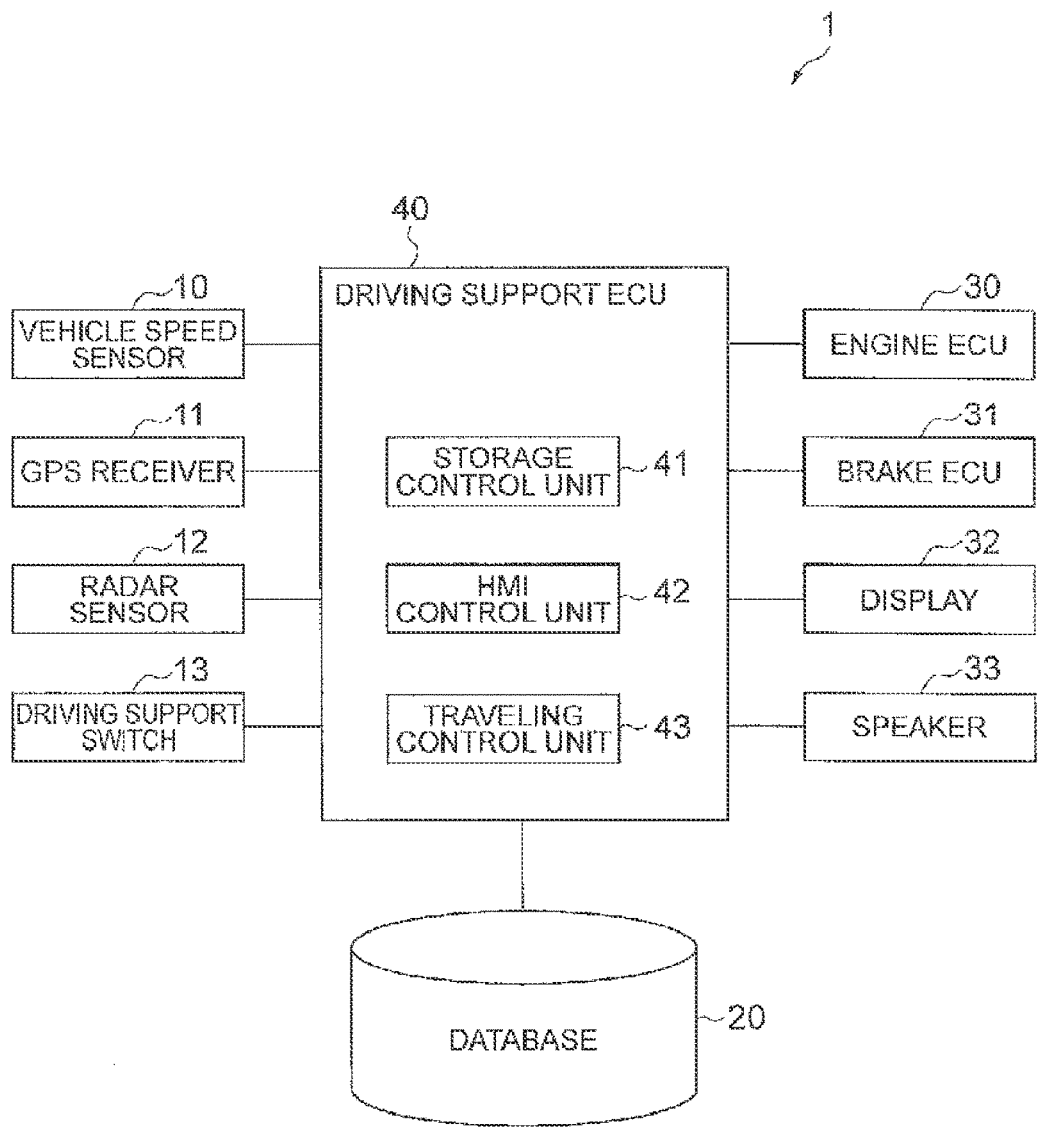
FIG. 1 is a configuration diagram of a driving support apparatus according to an embodiment of the present invention.

Hereinafter, an embodiment of the driving support apparatus in the present invention will be described with reference to the drawings. In the drawings, the same elements or equivalent elements will be referenced by the same reference signs and the description thereof will not be repeated.

In the driving support apparatus in the present invention, travel data of a vehicle by a driver's driving operation is stored, a target vehicle speed is set based on the travel data, and then, using the target vehicle speed, a traveling control of the vehicle is performed or information is provided to the driver. In the driving support apparatus in the present invention, the traveling control is performed in a case when driver's instruction is given. However, the driving support apparatus, even during the traveling control, in a case where the driver performs acceleration or deceleration operation, gives priority to the acceleration or the deceleration operation.

At a position where the travel data of a vehicle by a driver's driving operation is not stored, after obtaining travel data from multiple number of other vehicles through vehicle-to-vehicle communications or the like, the center value or the average value of the travel data may be set as the target vehicle speed. Alternatively, the target vehicle speed may be set based on a speed limit of the current traveling road. Alternatively, the target vehicle speed may be the speed set by the driver. The target vehicle speed is set to the position of each constant distance interval (for example, tens of meters or one hundred meters), and an acceleration control zone or a deceleration control zone is set in front of such a position in such a manner that the vehicle speed reaches the target vehicle speed at that position.

Incidentally, in a case of an expressway or a tollway, since the driving support can be performed such that the predetermined vehicle speed can be maintained, a fixed speed may be set as the target speed. However, in a case of a general road, in a situation in which the vehicle speed frequently changes due to various reasons such as a speed limit on each road, a surrounding situation such as a traffic signal, changes in an amount of traffic, and the like, it is necessary to change the target vehicle speed according to above described situation. If the target vehicle speed is not suitable for each position, the convenience of driving may be impaired. In the driving support apparatus of the present embodiment, since the target vehicle speed can be set for each position on the traveling route, the driving support apparatus is suitable for the general road where the vehicle speed frequently changes.

A configuration of a driving support apparatus 1 in the present embodiment will be described with reference to FIG. 1. FIG. 1 is a configuration diagram of the driving support apparatus 1 in the present embodiment.

The driving support apparatus 1 performs a driving support such that a driver does not feel uncomfortable. In order to do that, in a case where the speed is decreased to become a low speed during the traveling control, the driving support apparatus 1 ends the traveling control based on stored travel data. By ending the traveling control in this way, the driving support apparatus 1 is effective for preventing the position deviation in advance in a case where the vehicle is caused to stop at the stop position, and it is also effective in a case other than the case where the vehicle is caused to stop at the stop position, that is, in a case where the vehicle is caused to decrease the speed to a predetermined extremely low speed at a predetermined position. As an example of an effective case, there is a case where the speed is decreased to the extremely low speed at the position where the opposite side can be foreseen in a blind corner with no center line. In addition, as examples of other effective cases, there is a case where the speed is decreased to the extremely low speed at the position where the cross road can be foreseen on an intersection or a T-junction with no stop line throughout the road.

Figure 2A:
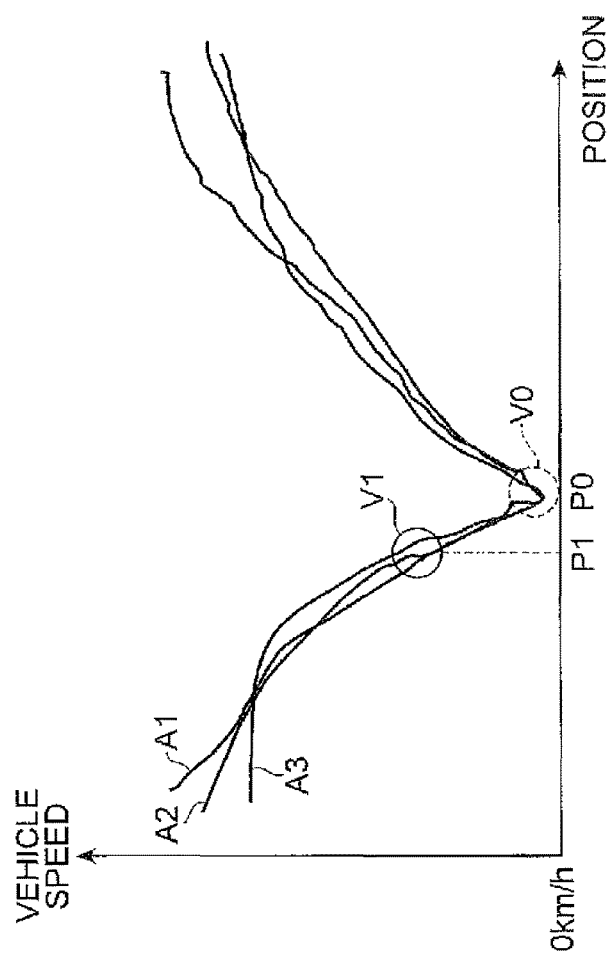
FIG. 2A and FIG. 2B illustrate an example of ending a traveling control before a vehicle stops in the driving support apparatus in FIG. 1.
Figure 2B:
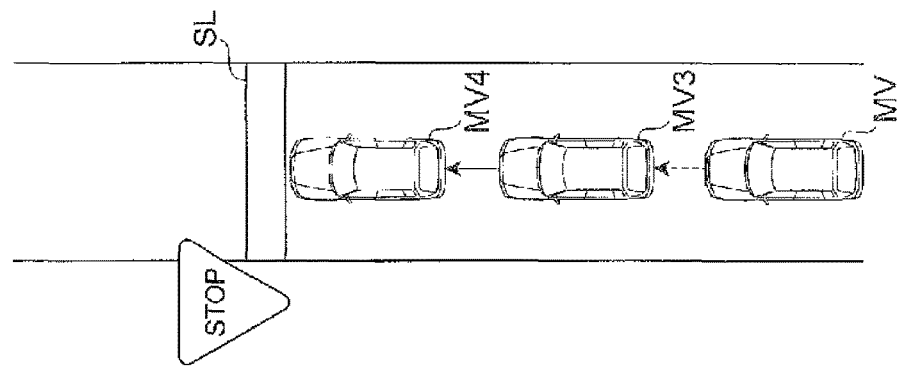
Figure 3A:
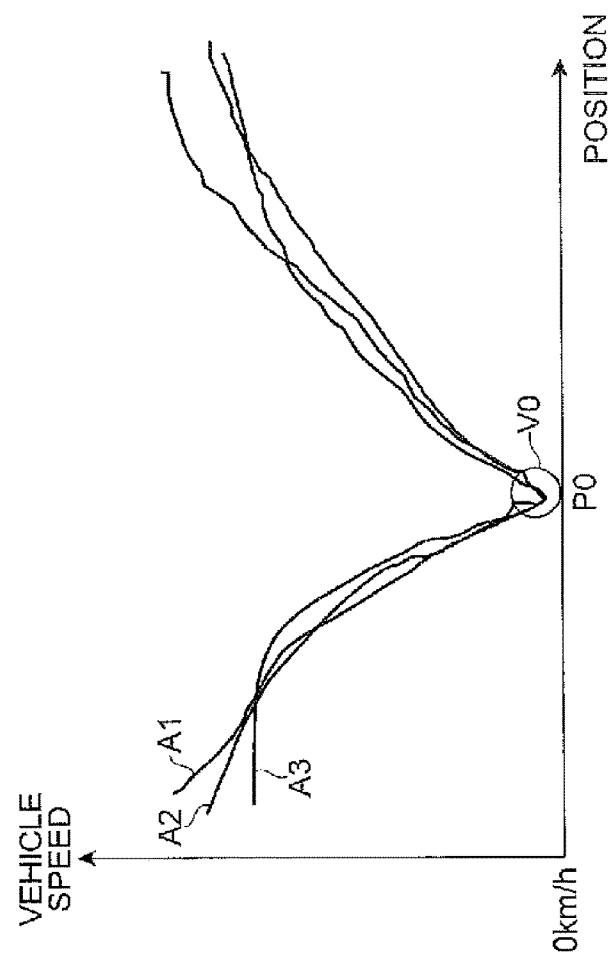
FIG. 3A and FIG. 3B illustrate an example of the traveling control in the driving support apparatus.
Figure 3B:
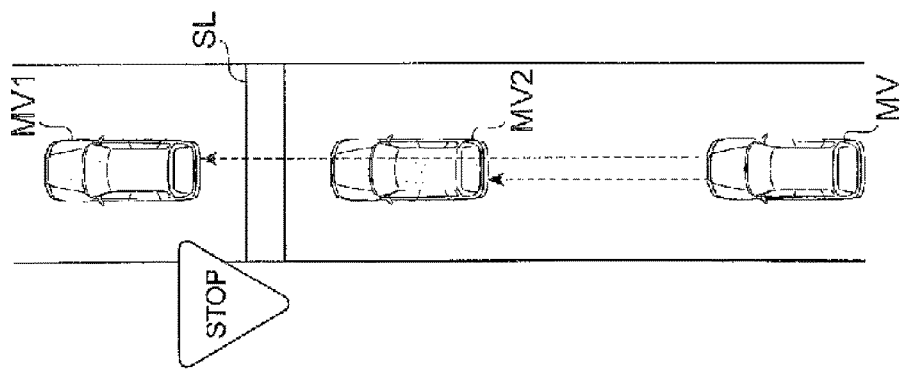
Figure 4A:
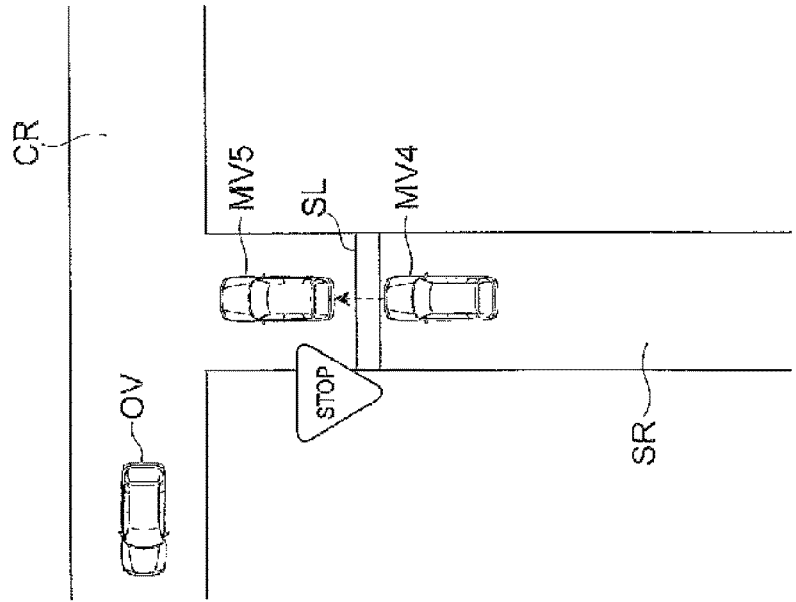
FIG. 4A and FIG. 4B are schematic diagrams illustrating a state of the vehicle before and after stopping.
Figure 4B:
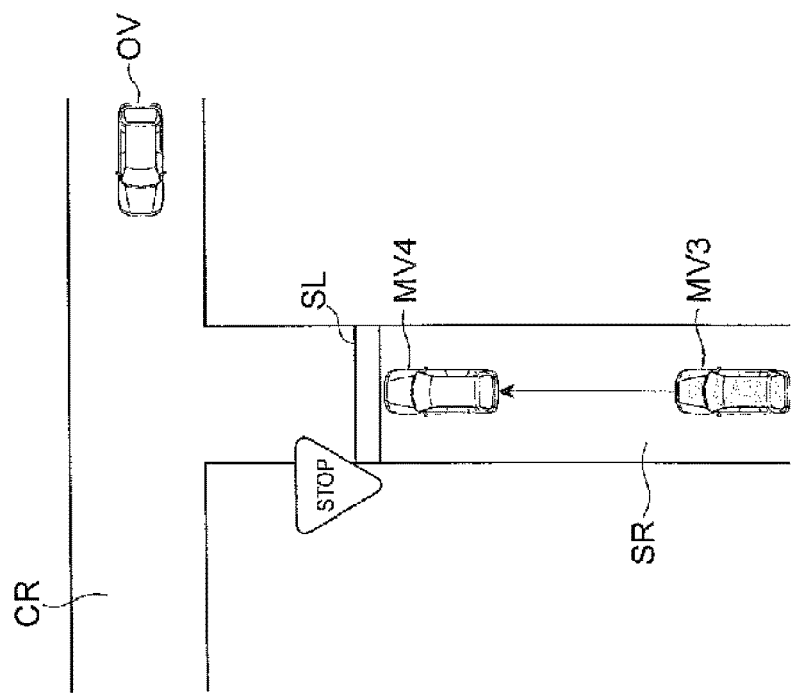

An overview of processing of the driving support apparatus 1 in order for the driver not to feel uncomfortable will be described with reference to FIG. 2A to FIG. 4B. FIG. 2A and FIG. 2B illustrate an example of ending the traveling control before the vehicle stops in the driving support apparatus 1. FIG. 2A illustrates an example of travel data when the vehicle temporarily stops and FIG. 2B is a schematic diagram illustrating a stopping state of the vehicle. FIG. 3A and FIG. 3B illustrate an example of the traveling control in the driving support apparatus in the related art. FIG. 3A illustrates an example of travel data when the vehicle temporarily stops and FIG. 3B is a schematic diagram illustrating a stopping state of the vehicle. FIG. 4A and FIG. 4B are schematic diagrams illustrating a state of vehicle before and after stopping. FIG. 4A illustrates the state when the vehicle stops and FIG. 4B illustrates the state when the vehicle starts. In FIG. 2A, FIG. 3A, FIG. 5A to FIG. 5D, FIG. 6, and FIG. 8A and FIG. 8B, the horizontal axis indicates the position (for example, the position in the front and rear direction of the vehicle which corresponds to a distance) and the vertical axis indicates the vehicle speed.

In the example illustrated in FIG. 2A and FIG. 3A, each solid line A1, A2, and A3 respectively illustrates travel data indicating the vehicle speed at each position when the vehicle travels by the driver's acceleration or deceleration operation on the same traveling route, and illustrates a case of decreasing the speed to the stop position and stopping temporarily, and starting from the stop position and increasing the speed. The stop position is the position where the vehicle stops, for example, the position immediately before a stop line SL illustrated in FIG. 2B and FIG. 3B. The vehicle speed is zero km/h at the stop position. The speed zero km/h is a vehicle speed when the vehicle stops, and strictly speaking, includes not only the zero km/h but also the extremely low vehicle speed (substantially zero km/h) considering the detection accuracy of a vehicle speed sensor.

In the driving support apparatus in the related art, as illustrated in FIG. 3A, when the vehicle speed V0 (substantially zero km/h) at the stop position P0 is obtained from the travel data A1, A2, and A3, the deceleration control is performed until the vehicle speed is decreased to V0 at the stop position P0. In this case, due to a detection error of the GPS included in the position data of the stop position P0 obtained by the travel data A1, A2, and A3 and the traveling control with respect to the two values of position and vehicle speed, as illustrated in FIG. 3B, there is a case in which the position where a vehicle MV stops by the deceleration control becomes a position MV1 which exceeds the stop line SL or a position MV2 which is in front of the stop line SL. Even if the position deviation like this is about one meter, the driver may feel uncomfortable.

Therefore, in the driving support apparatus 1, as illustrated in FIG. 2A, the deceleration control is performed until the vehicle speed reaches V1 (a vehicle speed which is equal to or higher than the threshold value) at a position P1 which occurs before the vehicle reaches the stop position P0 among the travel data A1, A2, and A3, and the deceleration control is not performed when the vehicle speed is less than the threshold value. In this case, as illustrated in FIG. 2B, the vehicle MV moves to a position MV3 which is a position in front of the stop line SL by a predetermined distance by the traveling control. After that, the vehicle MV moves to a position MV4 which is the position immediately before the stop line SL by the driver's driving operation. At this time, in the driving support apparatus 1, a notification to end the traveling control is given to the driver via the Human Machine Interface (HMI) to facilitate the driving operation.

Regarding a road environment, there is a road environment in which a road SR having a stop line SL and a road CR having a T-junction are linked. On this road CR, there is a case where the other vehicle OV is traveling or a pedestrian is walking. However, in a case where the other vehicle or the pedestrian does not exist when the travel data is stored, in the travel data of the deceleration direction, the vehicle speed becomes V0 (the vehicle speed indicating the stopping) at the stop position P0, and in the travel data of the acceleration direction, the vehicle speed increases immediately after the stopping and becomes the data for the acceleration. Using such travel data, when the acceleration control is performed immediately after the stopping, there is a possibility that the other vehicle or the pedestrian passes in front of the vehicle when the vehicle starts. Therefore, the driving support apparatus 1 starts the acceleration control only in a case where the acceleration is requested by the driver who performs a safety check. In this way, as illustrated in FIG. 4A, in a case where the other vehicle OV still does not pass ahead, since the driver does not request the acceleration control, the acceleration control is not started, and thus, the vehicle continues the stopped state at the position MV4 which is immediately before the stop line SL. Then, as illustrated in FIG. 4B, when the other vehicle OV passes ahead, since the driver requests the acceleration control, the acceleration control starts, and thus, the vehicle starts and moves to a position MV5 which is ahead of the stop line SL.

In addition, in a case where the vehicle stops at the stop position, the vehicle can quickly start by quickly arriving at the stop position and stopping. However, for example, in a case where the stop position is a stop line where a traffic signal exists and the traffic signal is the red light, even though the vehicle quickly arrives at the stop position immediately in front of the stop line and stops, the vehicle cannot start until the red signal is changed to a green signal. Alternatively, in a case where the stop position is a stop line which is provided on a railway crossing and a crossing gate is down, even though the vehicle quickly arrives at the stop position immediately in front of the stop line and stops, the vehicle cannot start until the crossing gate goes up. A traffic environment like this is a traffic environment in which a condition where the vehicle has to be stopped is not changed when the vehicle is in any situation (for example, even in a situation where the vehicle quickly arrives at the stop position and stops). In a case of such a traffic environment, since there is no need to stop in a hurry, the convenience to the driver increases when the vehicle is accurately stopped by an automatic control. Therefore, in the driving support apparatus 1, various types of deceleration targets are set in advance and a type of deceleration target in front of the vehicle during the traveling control is determined. When the type of deceleration target is in a traffic environment in which a constraint condition of the vehicle stopping is determined regardless of the state of the vehicle, the traveling control is continued such that a target vehicle speed (for example, zero km/h) is accurately satisfied at the deceleration final position (for example, a stop line or a position immediately before the stop line) which is the final target position of the deceleration control, without being ended even when the vehicle speed is less than the threshold value. At this time, when the vehicle approaches the deceleration final position, the traveling control is performed using position information with a high accuracy obtained by another method, without using the travel data in which a position error may be included. As the types of deceleration targets, there are types in a traffic environment in which the constraint condition of the vehicle stopping is determined regardless of the state of the vehicle and a type of a traffic environment in which the constraint condition of the vehicle stopping is determined by the state of the vehicle. The constraint condition of the vehicle stopping means condition that the vehicle has to stop, particularly, a condition of whether or not the vehicle has to stop for more than a predetermined time duration depending on the traffic environment. The type of deceleration target in the traffic environment in which the constraint condition of the vehicle stopping is determined regardless of the state of the vehicle includes, for example, the traffic environment in which the traffic signal is the red signal, the crossing gate on the railway crossing is down, and the like. The type of deceleration target in the traffic environment in which the constraint condition of the vehicle stopping is determined by the state of the vehicle includes, for example, the traffic environment in which there is no traffic signal, in which the crossing gate on the railway crossing is up, and the like. Regarding the deceleration final position, since the position information with a high accuracy is required, for example, the position information is obtained using map data and an image sensor using the camera.

In addition, in the type of deceleration target in the traffic environment in which the constraint condition of the vehicle stopping is determined regardless of the state of the vehicle, there is a case where the situation changes. For example, during the deceleration control of the vehicle with respect to the stop line at the position where the traffic signal exists, there is a case where the traffic signal changes from the red signal to the green signal. In this case, the driver is considered to request the acceleration control. At this time, the vehicle speed data at each position until the vehicle stops is also included in the stored travel data, and therefore, it is not possible to perform the traveling control using the travel data as it is. Therefore, in the driving support apparatus 1, according to the type of deceleration target, in a case where the acceleration request is received during the deceleration control (particularly, when the vehicle speed is higher the threshold value), the acceleration control is performed by extracting the vehicle speed for the acceleration from the travel data. That is, the vehicle speed for the acceleration and the position corresponding thereto are extracted from the travel data excluding the vehicle speed lower than that at the time of receiving the acceleration request.

The configuration of the driving support apparatus 1 will be described in detail. The driving support apparatus 1 includes a vehicle speed sensor 10, a GPS receiver 11, a radar sensor 12, a driving support switch 13, a database 20, an engine ECU (Electronic Control Unit) 30, a brake ECU 31, a display 32, a speaker 33, and a driving support ECU 40 (a storage control unit 41, an HMI control unit 42, and a traveling control unit 43).

In the present embodiment, the GPS receiver 11 is equivalent to a position acquisition unit in the claim attached hereto, the database 20 and the storage control unit 41 of the driving support ECU 40 are equivalent to a storage unit cited in the claim attached hereto, the engine ECU 30, the brake ECU 31, and the traveling control unit 43 of the driving support ECU 40 are equivalent to a traveling control unit cited in the claim attached hereto, and the driving support switch 13 is equivalent to an acceleration request detection unit cited in the claim attached hereto.

The vehicle speed sensor 10 is a sensor for detecting the vehicle speed. The vehicle speed sensor 10 detects the vehicle speed and sends the detected vehicle speed to the driving support ECU 40 as a vehicle speed signal. Depending on the detection accuracy of the vehicle speed sensor 10, even in a case where the vehicle stops, there is a case where the vehicle speed is not accurately zero km/h. In this case, even when the vehicle stops at the stop position, there is a case where the stored vehicle speed data is not a value of zero km/h (substantially zero km/h). As a sensor for detecting the vehicle speed, there is, for example, a wheel speed sensor that detects rotation speed (the number of pulses corresponding to the rotation of a wheel) of each wheel, the wheel speed is calculated from the number of rotation pulses of each wheel, and then the speed of the vehicle body (vehicle speed) is calculated from the wheel speed of each wheel.

The GPS receiver 11 includes a GPS antenna, a processing device, and the like. The GPS receiver 11 receives a GPS signal from each GPS satellite through the GPS antenna. Then, the GPS receiver 11 demodulates each GPS signal in the processing device, and calculates the current position (latitude and longitude) of the vehicle based on each item of demodulated GPS information. Then, the GPS receiver 11 outputs the information such as the current position of the vehicle to the driving support ECU 40 as a current position signal. Since there exists a detection error in the position detection by the GPS, the position of the vehicle obtained by the GPS receiver 11 also includes a detection error. In a case where a navigation apparatus is mounted on the vehicle, the current position information may also be provided from the navigation apparatus.

The radar sensor 12 is a radar for detecting an object in front of the vehicle (particularly, a vehicle ahead) using an electromagnetic wave such as a millimeter wave or a laser light. The radar sensor 12 transmits an electromagnetic wave to the front of the vehicle with scanning the electromagnetic wave in a horizontal direction, and receives the reflection wave that is reflected and returned. The radar sensor 12, in a case where the reflection wave cannot be received, determines that there is no vehicle ahead, and in a case where the reflection wave can be received, the radar sensor 12 calculates a relative distance, a relative speed, a relative direction (lateral position), and the like using the information (the scanning azimuth angle in the horizontal direction, a transmission time, a reception time, a reflection strength, and the like) with regard to each reflection point (each detection point) where the reflection wave can be received. Then, the radar sensor 12 transmits the presence or the absence of a vehicle ahead and various information items calculated in a case of the presence of the vehicle ahead to the driving support ECU 40 as a radar detection system. As methods for detecting a vehicle ahead, other means using a camera or a vehicle-to-vehicle communication apparatus may also be used.

The driving support switch 13 is a switch for operating and stopping of the traveling control by the driving support apparatus 1. The driving support switch 13 is an ON/OFF switch, and performs an ON/OFF switching with respect to an acceleration control (request for acceleration) and an ON/OF switching with respect to a deceleration control (request for deceleration). The driving support switch 13, for example, is a hardware switch provided in a center console of the vehicle on the steering wheel, and an ON/OFF instruction can be input by a pressing operation by the driver, or is a switch displayed on a display mounted on the vehicle, and the ON/OFF instruction can be input by touching of the display by the driver. The driving support switch 13 transmits the ON/OFF state with respect to each control input by the driver of the vehicle to the driving support ECU 40 as a switching signal.

As means for causing the driving support apparatus 1 to operate the travel control, an operation of an accelerator pedal or a brake pedal may be used. For example, as an operation for causing the driving support apparatus 1 to operate the acceleration control (operation for the acceleration request), an operation of lightly depressing the accelerator pedal or an operation of releasing the brake pedal may be used. As an operation for causing the driving support apparatus 1 to operate the deceleration control (operation for the deceleration request), an operation of lightly depressing the brake pedal or an operation of releasing the acceleration pedal may be used. In a case of the configuration in which the travel control is performed or stopped by the pedal operation as described above, there is no need to separately provide the driving support switch 13. The operation of lightly depressing the accelerator pedal, for example, is an operation in which a detection value of an accelerator opening degree of the accelerator pedal changes from zero to a value exceeding a threshold value (for example, a minimum value that the sensor can detect). The operation of releasing the accelerator pedal, for example, is an operation in which a detection value of an accelerator opening degree of the accelerator pedal changes from a predetermined value to zero. The operation of lightly depressing the brake pedal, for example, is an operation in which a detection value of an amount of depressing the brake pedal changes from zero to a value exceeding a threshold value (for example, a minimum value that the sensor can detect). The operation of releasing the brake pedal, for example, is an operation in which a detection value of an amount of depressing the brake pedal changes from a predetermined value to zero. In addition, as means for causing the driving support apparatus 1 to operate the travel control, a detection of a driver's line of sight or gesture, or the like may also be used. In a case of detection of the line of sight or the gesture, the line of sight or the gesture for operating the acceleration control or the deceleration control is set in advance and the driver's line of sight or the behavior of the driver's upper body is recognized using the image sensor in a camera. Then, whether or not there exists an acceleration request or a deceleration request is determined by determining whether or not the recognized line of sight or the behavior of the driver's upper body is the line of sight or the gesture for operating the acceleration control or the deceleration control. The above-described means for detecting the acceleration request by the operation with respect to the accelerator pedal or the brake pedal and means for detecting the acceleration request by the line of sight or the gesture also are equivalent to the acceleration request detection unit cited in the claim attached hereto.

The database 20 is a database that stores the travel data of the vehicle. The database 20 is configured in a predetermined region of the writable/readable storage device such as a hard disk. The travel data to be stored in the database 20 includes at least a speed and the number of times of traveling associated with each position for every constant distance. In a case where the vehicle travels more than once in the same position on the traveling route, the speeds of that multiple number of times of traveling are stored. The same position may not mean strictly the same position, but includes a position within a predetermined range in the front-rear direction (for example, a position of a few meters in a front-rear direction) with respect to the strictly same position or a position within a predetermined range in a horizontal direction (for example, a position in a different lane). The predetermined range is set considering the detection error of the means for detecting the position of the vehicle, or the like. The database 20 may be configured in the driving support ECU 40. In addition, there is a case where the detection time is linked to the data of each position to be stored.

The engine ECU 30 is an ECU that controls the engine (eventually, a driving force). The engine ECU 30 calculates a requested driving force (target acceleration) based on the driver's operation of the accelerator pedal. Then, the engine ECU 30 controls an amount of air intake, an amount of fuel injection, or an ignition for the acceleration to reach the target acceleration. Particularly, if an engine control signal is received from the driving support ECU 40, the engine ECU 30 performs a control for the acceleration to reach the target acceleration indicated in the engine control signal.

The brake ECU 31 is an ECU that controls the brake (eventually, a braking force) of each wheel. The brake ECU 31 calculates a requested braking force (target deceleration) based on the driver's operation of the brake pedal. Then, the brake ECU 31 controls a brake oil pressure in a wheel cylinder of each wheel for the deceleration to reach the target deceleration. Particularly, if a brake control signal is received from the driving support ECU 40, the brake ECU 31 performs a control for the deceleration to reach the target deceleration indicated in the brake control signal.

The display 32 is a display for providing information by displaying of the HMI of the driving support apparatus 1. The display 32 is a display that is commonly used with other vehicle-mounted devices. Examples of such a display include a head up display (HUD), a display of a navigation apparatus, and a display in a combination meter. If a display control signal is received from the driving support ECU 40, the display 32 displays the image based on the display control signal.

The speaker 33 is a speaker for providing information by a voice of the HMI of the driving support apparatus 1. The speaker 33 is a speaker that is commonly used with other vehicle-mounted devices. If a voice control signal is received from the driving support ECU 40, the speaker 33 outputs the voice based on the voice control signal.

The driving support ECU 40 includes a central processing unit (CPU), a read only memory (ROM), and a random access memory (RAM), and is an electronic control unit that integrally controls the driving support apparatus 1. In the driving support ECU 40, the storage control unit 41, the HMI control unit 42 and the traveling control unit 43 are configured by an application program stored in the ROM being loaded on the RAM and being executed in the CPU. The driving support ECU 40 receives each signal from the vehicle speed sensor 10, the GPS receiver 11, the radar sensor 12, and the driving support switch 13. At this time, the driving support ECU 40 links the received time of each signal to each information such as the vehicle speed obtained from each signal, if necessary. Then, in the driving support ECU 40, the processing tasks in each of the storage control unit 41, the HMI control unit 42, and the traveling control unit 43 are performed based on the information of each signal, and each control signal is transmitted to the engine ECU 30, the brake ECU 31, the display 32, and the speaker 33, if necessary.

The processing in the storage control unit 41 will be described. In a case where the travel data during the driver's driving operation is collected and stored in order to use it for the driving support, if the information of all the positions on the traveling route is stored and learned, an enormous storage capacity is required. However, since the storage capacity of the database 20 is limited, the amount of data to be stored can be suppressed by storing the information on each position in a predetermined sampling period considering the storage capacity.

The storage control unit 41 causes the vehicle speed and the number of times of traveling to be stored in association with each position on the traveling path in the predetermined sampling period, and causes the detection time also to be linked and stored, if necessary. Particularly, the storage control unit 41 compares each position on the traveling route where the vehicle traveled previously, which is stored in the database 20, and the current position where the vehicle currently travels. In a case where the current position and the stored position are the same positions, the storage control unit 41 causes the current vehicle speed to be stored in association with the stored position, and adds one to the number of times of traveling. The predetermined sampling period is set considering the storage capacity of the database 20, and for example, has an interval of a few meters, tens of meters, or one hundred meters. The sampling periods may be set as the period of time.

The processing in the HMI control unit 42 will be described. In the driving support apparatus 1, the vehicle speed may not be constant but the vehicle speed targeted for the traveling control may frequently be changed at each position while the vehicle travels. Therefore, the driving support apparatus 1 provides the information of the traveling range by the traveling control, the target vehicle speed of the traveling control, and the content of the traveling control to the driver as notification by the HMI.

The HMI control unit 42, for every time the vehicle acquires the current position, sequentially acquires the target vehicle speed and the target position set by the travel data in the traveling control unit 43 within a predetermined range (for example, within 100 meters) from the current position on the current traveling route (road) of the vehicle. In a case where the target vehicle speed or the like is not set in the traveling control unit 43, the notification by the HMI may not be performed, or the target vehicle speed may be set from the travel data of other vehicles or the limit speed of the road.

The HMI control unit 42 generates image information for displaying the current target vehicle speed, an area of acceleration or deceleration control, the control currently performed (acceleration control or deceleration control), the current position, and the like, and transmits a display control signal made from the image information to the display 32. At this time, a color coding in accordance with the type of control may be performed such that the type of control currently performed is easily recognized. In addition, the HMI control unit 42 generates voice information for outputting the voice of the current target vehicle speed, an area of acceleration or deceleration control, the control currently performed (acceleration control or deceleration control), and the like, and transmits a voice control signal made from the voice information to the speaker 33.

By such a notification of the HMI, the driver recognizes the target vehicle speed or the area of each control, and then, in a case where the traveling control at each area for reaching the target vehicle speed is necessary, an intention of the acceleration control or the deceleration control is presented. As a method of the presentation, by the driving support switch 13, ON operation with respect to the acceleration operation or ON operation with respect to the deceleration operation is performed, or in a case there is no such switch, an operation of slightly depressing the accelerator pedal or releasing the brake pedal in a case of the acceleration control, or an operation of slightly depressing the brake pedal or releasing the accelerator pedal in a case of the deceleration control, is performed. In accordance with such operations, the processing in the traveling control unit 43 is performed.

Particularly, in a case where a predetermined condition described below is satisfied in the traveling control unit 43 and the deceleration control on the vehicle ends, the HMI control unit 42 generates image information for displaying an intention to end the deceleration control and transmits a display control signal made from the image information to the display 32, or generates voice information for outputting the voice of the intention that the deceleration control ends and transmits a voice control signal made from the voice information to the speaker 33. By such a notification of the HMI, since the deceleration control on the vehicle automatically ends, the driver knows that it is necessary to decelerate the vehicle (particularly, to stop) by the driver's own driving operation.

Figure 6:
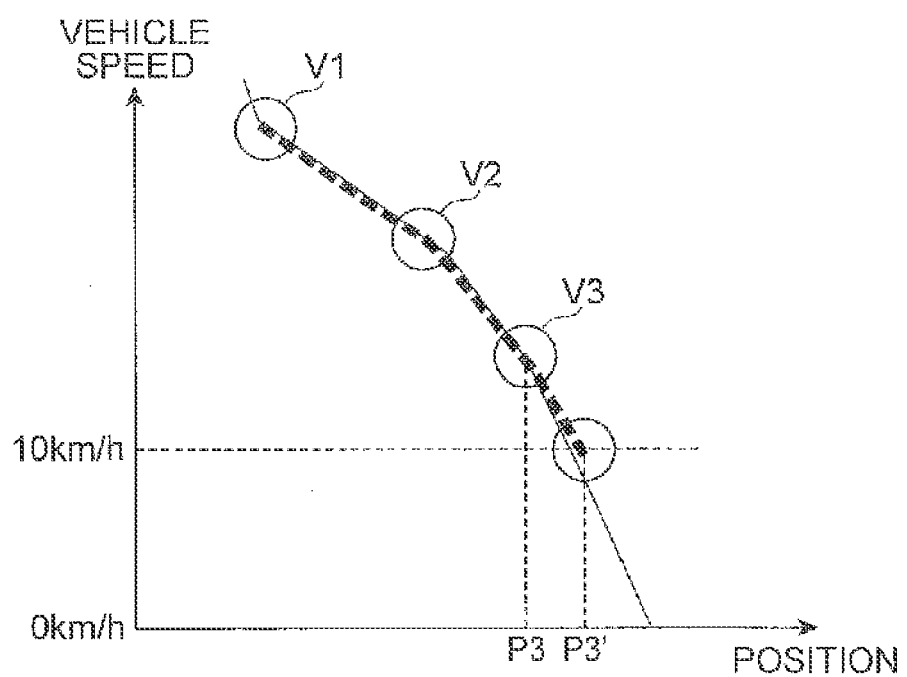
FIG. 6 illustrates another example of a change of the vehicle speed by stored travel data and a traveling control.

The processing in the traveling control unit 43 will be described with reference to FIG. 5A to FIG. 8B. FIG. 5A to FIG. 5D illustrate an example of changes of the vehicle speed by stored traveling data and traveling control. FIG. 5A illustrates a case of performing the traveling control until the vehicle stops, FIG. 5B illustrates a case of ending the traveling control before the vehicle stops, FIG. 5C illustrates a case of performing a traveling control that the driver did not intend, and FIG. 5D illustrates a case of performing a traveling control that the driver intended. FIG. 6 illustrates another example of a change of the vehicle speed by stored travel data and a traveling control. FIG. 7 illustrates an example of a conversion map of an amount of vehicle speed change to a target vehicle speed corresponding to a speed used in the traveling control unit 43 and an amount of position change to a target position. FIG. 8A and FIG. 8B illustrate an example of changes of the vehicle speed by the stored travel data and the traveling control in a case of acceleration during the deceleration. FIG. 8A illustrates a case where a vehicle speed of next acceleration becomes a target vehicle speed, and FIG. 8B illustrates a case where a vehicle speed of a nearest maximum point becomes a target vehicle speed.

As a basic traveling control, in a case where there is no vehicle ahead within a constant distance, the acceleration or the deceleration control is performed such that the vehicle speed reaches the target vehicle speed at a predetermined position ahead, and in a case where there is a vehicle ahead within a constant distance, a follow-up control is performed such that the vehicle travels to follow the vehicle ahead with a target vehicle-to-vehicle distance with respect to the vehicle ahead. Particularly, in a case where the travel data of each position on the current traveling route is stored, the target position and the target vehicle speed are set using the travel data. Besides the acceleration control or the deceleration control, a constant speed control is also performed so as to maintain the target vehicle speed, if necessary.

Particularly, during the deceleration control, if the vehicle speed is lower than the threshold value, the deceleration control ends. The threshold value is a low vehicle speed such that the driver may recognize the position deviation with respect to the position of the vehicle by the traveling control. The threshold value is appropriately set by an experiment or a simulation, and for example, is ten km/h. The threshold value may be variable according to the final target vehicle speed of the deceleration control. After ending of the deceleration control, the traveling control is temporarily stopped, and if the acceleration request is received (the intention of acceleration control is presented) from the driver, the acceleration control starts.

For example, in a case where the travel data when the vehicle stops is stored, as illustrated in FIG. 5A, in the driving support apparatus in the related art, as illustrated by a thick broken line C0, the deceleration control is performed such that each vehicle speed becomes V1, V2, V3, V4, and V5 at each position P1, P2, P3, P4, and P5 obtained from the travel data, and the control continues until the vehicle stops. On the other hand, as illustrated in FIG. 5B, the traveling control unit 43, as illustrated in a thick broken line C1, performs the deceleration control until the vehicle speed reaches the target vehicle speed V3 (position P3) which is higher than the threshold value (ten km/h), and ends the deceleration control when the vehicle speed becomes lower than the threshold value. Therefore, the vehicle stops by the driver's driving operation after the position P3 without using each vehicle speed V4 and V5 at each position P4 and P5 from the travel data.

In a case where the deceleration control ends and the acceleration control starts, as illustrated in FIG. 5C, if the vehicle speed V7 which is higher than the threshold value is extracted from the travel data, and the traveling control is performed with the vehicle speed V7 as the target vehicle speed, as illustrated in a thick broken line C', the control shows a pattern of vehicle speed different from that which the driver assumes. Therefore, in a case where the deceleration control ends and the acceleration control starts, as illustrated in FIG. 5D, it is necessary to temporarily stop the traveling control such that the control shows a pattern of vehicle speed that the driver assumes. To this end, in a case where the deceleration control ends, the traveling control stops for a predetermined time interval under any one of the below-described conditions or a combined condition thereof. As the conditions, there are conditions such as: a condition in which the control stops in a certain time period or a certain distance zone in the travel data when the target vehicle speed does not exist, a condition in which the control stops until the vehicle speed meets the predetermined vehicle speed (for example, zero km/h), and a condition in which information (flag) that instructs stopping of the control is separately set and the information is reflected in the control. In addition, since the deceleration control ends in a case where the vehicle speed is lower than the threshold value, at the time of storing the travel data in the storage control unit 41, the vehicle speed data with the vehicle speed being lower than the threshold value may not be stored as the travel data. After the deceleration control ends and the traveling control is temporarily stopped under any of the conditions described above, the acceleration control starts.

As a result, as illustrated in FIG. 5D, the control shows a pattern of vehicle speed that the driver assumes as illustrated in a thick broken line C2. That is, the traveling control unit 43 extracts the vehicle speed V6 as well that is lower than the threshold value from the travel data, and with the vehicle speed V6 as the target vehicle speed, performs the acceleration control such that the vehicle speed becomes V6, V7, and V8 at a position P6, P7, and P8 obtained from the travel data.

In the examples described above, as illustrated in FIG. 5B, the deceleration control is performed with the position P3 as the target, where the vehicle speed becomes V3 which is equal to or higher than the threshold value from the travel data. In addition to this, as illustrated in FIG. 6, setting a position P3' which forcibly becomes the target position at the time point of threshold vehicle speed can also be considered. The position P3' may be derived from the position before and after the positions stored as the travel data, or when the travel data is stored in the storage control unit 41, the travel data regarding the position at the time when the vehicle speed becomes the threshold vehicle speed may be stored. By forcibly setting the target position as described above, in a case where the position interval stored in the storage control unit 41 as the travel data is widen (for example, a 50 meter interval or a 100 meter interval), it is possible to widen the range of control up to the position of the threshold value.

In addition, in a case where the deceleration control ends, a method in which the target vehicle speed and the target position are uniformly changed can be considered. For example, in a case where the position where the vehicle speed becomes zero km/h is stored as the travel data, the target vehicle speed is changed to ten km/h with the position five meters in front of the stored position as the target position, and the deceleration control is performed until the vehicle speed becomes the target vehicle speed at the target position, and then, the deceleration control ends. In addition, a conversion map as illustrated in FIG. 7 is set in advance and held, and the target vehicle speed and the target position may be changed according to the conversion map. For example, according to the conversion map illustrated in FIG. 7, in a case where the position where the vehicle speed becomes zero km/h is stored as the travel data, the target vehicle speed is changed to ten km/h with the position five meters in front of the stored position as the target position, in a case where the position where the vehicle speed becomes three km/h is stored as the travel data, the target vehicle speed is changed to eight km/h with the position four meters in front of the stored position as the target position, and in a case where the position where the vehicle speed becomes seven km/h is stored as the travel data, the target vehicle speed is changed to five km/h with the position one meter in front of the stored position as the target position. The deceleration control is performed until the vehicle speed becomes the target vehicle speed at the target position, and then, the deceleration control ends.

In addition, even in a case where the vehicle speed during the deceleration control becomes lower than the threshold value, the type of deceleration target is determined, and when the type of deceleration target is a type of a traffic environment in which the constraint condition of the vehicle stopping is determined by the state of the vehicle, the deceleration control continues to be performed until the vehicle stops. At this time, during the deceleration control, the target vehicle speed and the target position are set using the travel data and the deceleration control is performed, and when the vehicle speed becomes lower than the predetermined vehicle speed (for example, five km/h), the deceleration control is performed without using the travel data in order not to give a make a driver feel uncomfortable due to the position deviation. For example, the position information of the actual stop line is obtained, and the deceleration control is performed such that the vehicle stops at the position in the obtained position information.

In addition, even when the type of deceleration target is a type of a traffic environment in which the constraint condition of the vehicle stopping is determined by the state of the vehicle during the deceleration control, in a case where the traffic environment is changed to a state where the vehicle can be accelerated before the vehicle speed becomes lower than the threshold value, if the acceleration request by the driver is received, the vehicle speed for the acceleration is extracted from the travel data excluding the vehicle speed lower than the current vehicle speed, the target vehicle speed is set and the control is shifted to the acceleration control. For example, as illustrated in FIG. 8A and FIG. 8B, when the deceleration control is performed such that each vehicle speed becomes V10, V11, and V12 at each position P10, P11, and P12, by the travel data, the acceleration request AR by the driver is assumed to be received before the vehicle speed becomes lower than the threshold value. In this case, as illustrated in FIG. 8A, a vehicle speed V15 that is the first speed which becomes higher than the vehicle speed at the time when the acceleration request AR by the driver is received is extracted, and the acceleration control is performed from the position where the acceleration request AR is received, with this vehicle speed V15 as the target vehicle speed, such that the vehicle speed becomes the target vehicle speed V15 at a position P15. In this case, among the travel data, a vehicle speed V13 at a position P13 and a vehicle speed V14 at a position P14 are not used for the control. Alternatively, as illustrated in 8B, a vehicle speed V17 which is higher than the vehicle speed at the time when the acceleration request AR by the driver is received and which is the first maximum point from the position of acceleration request AR (or stop position) within a target range is extracted from the travel data, and the acceleration control is performed from the position where the acceleration request AR is received, with this vehicle speed V17 as the target vehicle speed, such that the vehicle speed becomes the target vehicle speed V17 at the position P17. In this case, among the travel data, the vehicle speed V13 at the position P13, the vehicle speed V14 at the position P14, the vehicle speed V15 at the position P15, and the vehicle speed V16 at the position P16 are not used for the control. The target range is appropriately set by an experiment or a simulation, and for example, is 100 meters. Besides the first maximum point within the target range, in a case where there exists a plurality of maximum points within the target range, a vehicle speed at the largest maximum point out of the plurality of maximum points may be used as the target vehicle speed. In addition, conditions for receiving the acceleration request during the deceleration control may be provided. Such a condition, for example, is a condition in which the position of the vehicle is a position within a certain range from the stop position and the vehicle speed is a speed within a certain vehicle speed from zero km/h. A certain range is appropriately set by an experiment or a simulation, and for example, is 100 meters. In addition, a certain vehicle speed is appropriately set by an experiment or a simulation, and for example, is 30 km/h.

The specific processing will be described. In a case where, by the driver's operation using the driving support switch 13, an operation is performed for causing the acceleration control or the deceleration control to be operated, the traveling control unit 43 determines whether or not there exists a vehicle ahead within a certain distance based on the information from the radar sensor 12. In a case where a vehicle ahead exists within a certain distance, the traveling control unit 43 calculates target acceleration or deceleration necessary for making a vehicle-to-vehicle ahead distance become a target vehicle-to-vehicle distance based on the difference between the vehicle-to-vehicle ahead distance and the target vehicle-to-vehicle distance. In a case where the target acceleration or deceleration has a positive value, the traveling control unit 43 sets target acceleration and transmits the target acceleration to the engine ECU 30 as an engine control signal. In a case where the target acceleration or deceleration has a negative value, the traveling control unit 43 sets a target deceleration and transmits the target deceleration to the brake ECU 31 as a brake control signal.

In a case where a vehicle ahead does not exist within a certain distance, the traveling control unit 43, in a case where the travel data for the position within a certain range (for example, within 50 meters or within 100 meters) from the current position on the current traveling route (road) of the vehicle is stored in the database 20, sets a position nearest from the current position among the stored positions as a target position, and sets a target vehicle speed using the vehicle speed data linked to above described target position. In a case where one vehicle speed data linked to the position is stored, that one vehicle speed is set as the target vehicle speed as it is. In a case where a plurality of vehicle speed data linked to the position is stored, for example, an average value or a center value of the plurality of vehicle speed data may be set as the target vehicle speed, or for the sake of safety, a minimum value or $20^{th}$ percentile value (a vehicle speed corresponding to lower 20% of all the vehicle speed data) may be set as the target vehicle speed. Alternatively, a value that matches the characteristics of the driver or vehicle may be set; for example, if the driver's average vehicle speed is high, a maximum value may be set as the target vehicle speed. In a case where the travel data for the position within the predetermined range is not stored, the target vehicle speed is set using the limit speed of the currently traveling road or the travel data of other vehicles. In a case where target vehicle speed cannot be set from the travel data of the host vehicle, the driving support apparatus may be configured not to perform the driving support in the area where the target vehicle speed is not set. In this case, such an effect is notified to the HMI.

When the target position and the target vehicle speed are set, the traveling control unit 43 calculates the target acceleration or deceleration necessary for making the vehicle speed at the target position become the target vehicle speed based on the difference between the current vehicle speed and the target vehicle speed. In a case where the target acceleration or deceleration is a positive value, the traveling control unit 43 sets target acceleration and transmits the target acceleration to the engine ECU 30 as the engine control signal. In a case where the target acceleration or deceleration is a negative value, the traveling control unit 43 sets a target deceleration and transmits the target deceleration to the brake ECU 31 as the brake control signal.

Particularly, during the deceleration control (in a case where the deceleration control is performed using the vehicle speed data of the travel data having a deceleration direction), the traveling control unit 43 determines whether or not the current vehicle speed is lower than the threshold value. In a case where it is determined that the current vehicle speed is lower than the threshold value, the traveling control unit 43 determines whether or not the type of deceleration target in front of the vehicle is a type of a traffic environment in which a constraint condition of the vehicle stopping is determined regardless of the state of the vehicle. As methods for determining the type of deceleration target, there are methods in which, for example, the traffic environment in front of the vehicle may be determined to use a map data. In addition, as a method for determining the type of deceleration target, there are methods in which the traffic environment in front of the vehicle is recognized by the image sensor using a camera, and the type may be determined using the recognized traffic environment, or the traffic environment in front of the vehicle recognized by a navigation apparatus is acquired, and the type may be determined by the acquired traffic environment. Additionally, as a method for determining the type of deceleration target, a method may be adopted in which the traffic environment in front of the vehicle is received from a road side apparatus using the road-to-vehicle communications and the type is determined using the received traffic environment, or in which the time data of the vehicle speed data linked to each position in front of the current position stored in the database 20 is analyzed and in which the traffic environment in front of the vehicle is acquired, and the type is determined using the acquired traffic environment. In a case where the type of deceleration target in front of the vehicle is determined to be a type of deceleration target of the traffic environment in which the constraint condition of the vehicle stopping is determined by the state of the vehicle (in a case of a traffic environment in which the vehicle can quickly start if the vehicle quickly stops at the stop position), the traveling control unit 43 ends the deceleration control performed using the vehicle speed data in the deceleration direction. Subsequently, the traveling control unit 43 sets a duration in which the traveling control is temporarily stopped under any conditions described above, and the traveling control is not performed during that duration.

On the other hand, when the type of deceleration target in front of the vehicle is a type of deceleration target of a traffic environment in which a constraint condition of the vehicle stopping is determined regardless of the state of the vehicle, the traveling control unit 43 does not end the traveling control, and continues the traveling control such that the target vehicle speed is accurately satisfied at the deceleration final position (particularly, the stop position) which is the final target position of the deceleration control. At this time, the traveling control unit 43, until the current vehicle position approaches the deceleration final position (for example, up to the position a few meters before the deceleration final position), sets the target position and the target vehicle speed similar to those described above using each position and each vehicle speed stored in the database 20, and performs the deceleration control similar to that described above. Then, the traveling control unit 43, when the current vehicle position approaches the deceleration final position, acquires the highly accurate position information of the deceleration final position, and with the acquired highly accurate position information as the target position, performs the traveling control similar to that described above such that the vehicle speed becomes the final target vehicle speed at the target position (for example, zero km/h). Regarding the deceleration final position (for example, the position of the stop line), since the highly accurate position information is needed; for example, the position information is acquired using a map data or an image sensor using the camera. In a case where the highly accurate position information is obtained by position detection using the GPS, the traveling control up to the deceleration final position may be performed using each position and each vehicle speed stored in the database 20.

In a case where, by the driver's operation using the driving support switch 13, an operation is performed for causing the acceleration control to be operated after the temporary stopping of the traveling control for a predetermined duration, and in a case where the travel data of the position within a predetermined range from the current position on the current traveling route (road) of the vehicle is stored in the database 20, the traveling control unit 43 sets the position nearest from the current position as the target position and sets the target vehicle speed using the vehicle speed data linked to that position. This target vehicle speed is, for example, a target vehicle speed for the acceleration from the position where the vehicle stops. Then the traveling control unit 43 performs the control similar to that described above using the target position and the target vehicle speed. The control is the acceleration control.

In a case where the current vehicle speed is not lower than the threshold value, the traveling control unit 43, as similar to the case described above, during the deceleration control, in a case where the type of deceleration target in front of the vehicle is determined to be a type of deceleration target of a traffic environment in which a constraint condition of the vehicle stopping is determined regardless of the state of the vehicle, determines whether the situation of the traffic environment where the vehicle can be accelerated is changed or not. As methods for the determining the situation of the traffic environment, there are methods in which, for example, the traffic environment in front of the vehicle is recognized by the image sensor using a camera, and the situation may be determined using the recognized traffic environment, the traffic environment in front of the vehicle recognized by a navigation apparatus is acquired, and the situation may be determined by the acquired traffic environment, or the traffic environment in front of the vehicle is received from a road side apparatus using the road-to-vehicle communications, and the situation is determined using the received traffic environment. In a case where it is determined that the situation of the traffic environment where the vehicle can be accelerated is changed, and in a case where the condition that the current position of the vehicle is a position within a certain range from the stop position and the current vehicle speed is a speed within a certain range from zero km/h is satisfied, and if, by the driver's operation using the driving support switch 13, an operation is performed for causing the acceleration control to be operated, the traveling control unit 43 extracts the vehicle speed for acceleration and the position thereof from the travel data before and after the stop position stored in the database 20 while excluding the speed lower than the current vehicle speed, sets the target position and the target vehicle speed, and performs the control similar to that described above using the target position and the target vehicle speed. This control is the acceleration control. When the vehicle speed for acceleration is extracted from the travel data, as described above, for example, the first vehicle speed is extracted, which becomes higher than the speed when the operation for causing the acceleration control to be performed is operated, or the speed of the maximum point within the target range is extracted.

Figure 9:
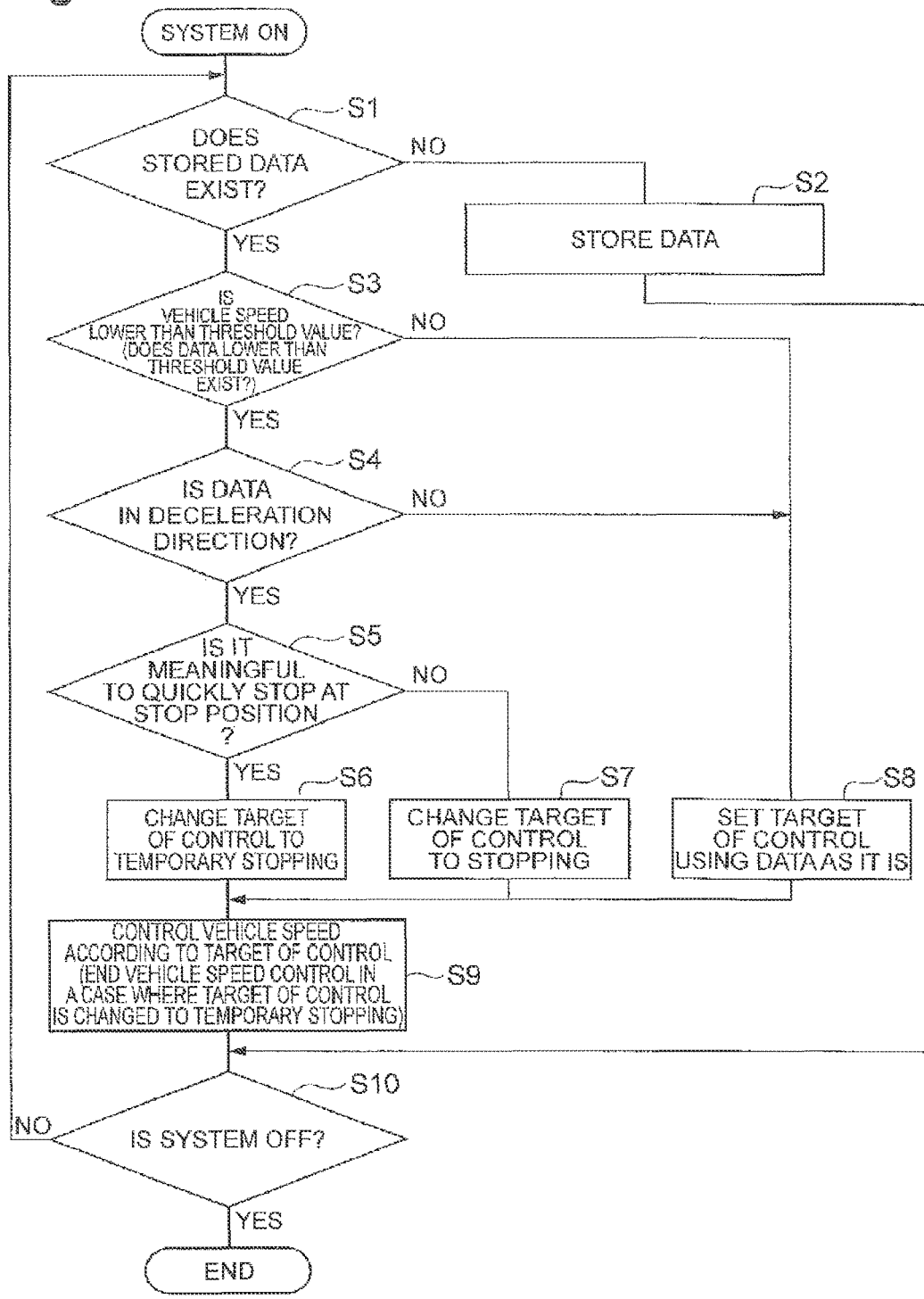
FIG. 9 is a flow chart illustrating a flow of operation in the driving support apparatus in FIG. 1.
Figure 10:
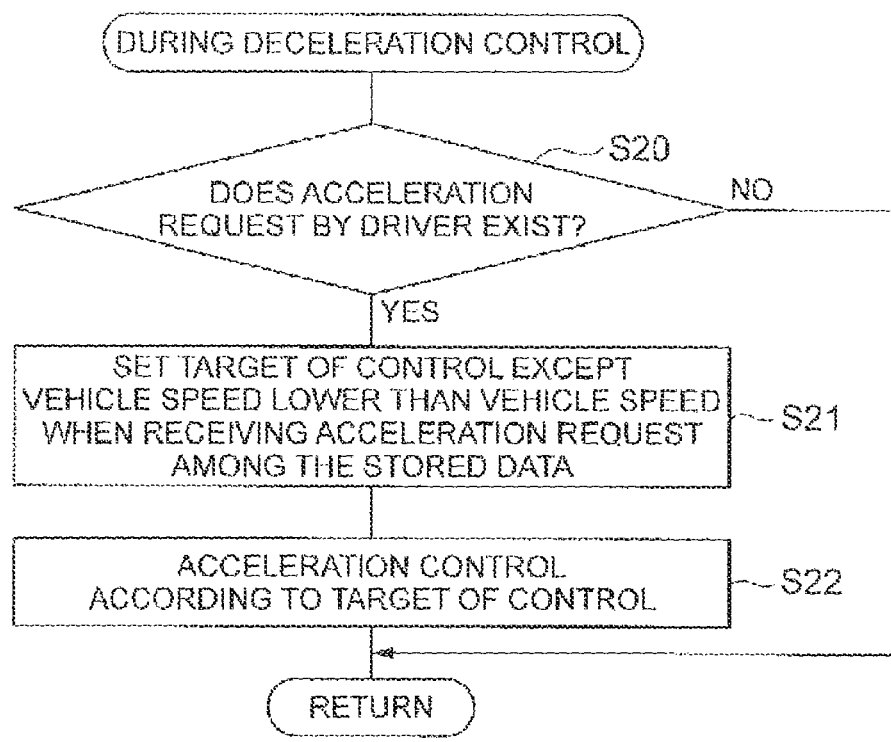
FIG. 10 is a flow chart illustrating a flow of operation in a case where an acceleration request is received during the deceleration control in the driving support apparatus in FIG. 1.

The operation of the driving support apparatus 1 will be described along with a flow chart in FIG. 9 with reference to FIG. 1. Particularly, the operation in a case where the acceleration request is received during the deceleration control will be described along with a flow chart in FIG. 10. FIG. 9 is the flow chart illustrating a flow of operation in the driving support apparatus 1. FIG. 10 is the flow chart illustrating a flow of operation in a case where the acceleration request is received during the deceleration control in the driving support apparatus 1. In a case where the driver drives the vehicle by the driver's own operation for acceleration or deceleration, usually, the driver adjusts the vehicle speed such that a predetermined vehicle-to-vehicle distance can be made in a case where there exists a vehicle ahead within a certain distance, and adjust the vehicle speed by the acceleration or deceleration of the driver's preference in a case where there does not exist a vehicle ahead within a certain distance. In this description of the operation, regarding the deceleration control using the travel data of the deceleration direction, the description will be made with the deceleration control of the case of vehicle stopping.

The vehicle speed sensor 10 detects the vehicle speed for each constant time period and transmits the vehicle speed signal to the driving support ECU 40. The GPS receiver 11 detects the current position of the vehicle for each constant time period based on the GPS signal from a GPS satellite and transmits the current position signal to the driving support ECU 40. The radar sensor 12 performs a detection of a vehicle ahead in front of the vehicle for each constant time period using the electromagnetic wave and transmits the radar detection signal to the driving support ECU 40. The driving support switch 13 transmits the switching signal to the driving support ECU 40 if there is an input operation by the driver. When these signals are transmitted, the driving support ECU 40 receives the signals and acquires information items from the signals.

After the driving support ECU 40 starts (after a system in the vehicle is ON (an accessory switch is ON or an ignition switch is ON)), the driving support ECU 40 determines whether or not the travel data for the current position of the vehicle is stored in the database 20 each time the current position of the vehicle becomes the position of the sampling period (S1). In a case where the travel data for the position is determined not to be stored yet in S1, the driving support ECU 40, in a case where the vehicle travels by the driver's driving operation, causes the database 20 to store the data such as the vehicle speed at that position (S2).

In a case where the travel data for the position is determined to be stored in S1, the driving support ECU 40 determines whether or not the current vehicle speed is lower than the threshold value (S3). In a case where the current vehicle speed is equal to or higher than the threshold value in S3, the driving support ECU 40 sets the target position and the target vehicle speed of the traveling control using the data stored in the database 20 as it is (S8).

Then, the driving support ECU 40 generates the image information for displaying on the HMI using the target vehicle speed and transmits the display control signal to the display 32. The display 32 displays the image of the display control signal when receiving the display control signal. In addition, the driving support ECU 40 generates the voice information for the voice output of the HMI using the target vehicle speed and transmits the voice control signal to the speaker 33. The speaker 33 outputs the voice of the voice control signal when receiving the voice control signal.

The driver receives the information by the display of the display image on the display 32 or the information by the output voice from the speaker 33, and in a case where the driver has an intention of performing the acceleration control or the deceleration control using the driving support apparatus 1, the driver performs the operation for causing any of the controls to be operated using the driving support switch 13. In a case where the driver's intention of the acceleration control or the deceleration control is indicated to the driving support switch 13, the driving support ECU 40 determines whether or not the vehicle ahead exists within a certain distance based on the information from the radar sensor 12, and in a case where the vehicle ahead exists within the certain distance, the driving support ECU 40 calculates the target acceleration or deceleration for making the vehicle-to-vehicle distance become the target vehicle-to-vehicle distance based on the difference between the vehicle-to-vehicle ahead distance and the target vehicle-to-vehicle distance. Then, the driving support ECU 40, in a case where the target acceleration or deceleration has a positive value, sets the target acceleration and transmits the engine control signal to the engine ECU 30, and in a case where the target acceleration or deceleration has a negative value, the driving support ECU 40 sets the target deceleration and transmits the brake control signal to the brake ECU 31. The engine ECU 30 performs the engine control for making the acceleration become target acceleration indicated in the engine control signal when receiving the engine control signal. The brake ECU 31 performs the brake control for making the deceleration become target deceleration indicated in the brake control signal when receiving the brake control signal. According to each of these controls, the vehicle travels to follow the vehicle ahead with a vehicle-to-vehicle distance of approximately target vehicle-to-vehicle distance.

In a case where the vehicle ahead does not exist within the certain distance, the driving support ECU 40 calculates the target acceleration or deceleration needed for making the vehicle speed at the target position become the target vehicle speed based on the difference between the current vehicle speed and the target vehicle speed (S9). In a case where the target acceleration or deceleration has a positive value, the driving support ECU 40 sets the target acceleration and transmits the engine control signal to the engine ECU 30 (S9). In a case where the target acceleration or deceleration has a negative value, the driving support ECU 40 sets the target deceleration and transmits the brake control signal to the brake ECU 31 (S9). When receiving each control signal, the engine ECU 30 and the brake ECU 31 respectively perform the controls similar to those described above (S9). By each of the controls, the vehicle speed at the target position becomes the target vehicle speed. In the traveling control here, there is the case of deceleration control using the data of the deceleration direction as well as the case of acceleration control using the data of the acceleration direction.

In a case where the current vehicle speed is determined to be lower than the threshold value in S3, the driving support ECU 40 determines whether or not the vehicle speed data stored in the database 20 before and after the current vehicle speed is the data of the deceleration direction (S4). In a case where the vehicle speed data is determined not to be the data of the deceleration direction in S14, the driving support ECU 40 sets the target position and the target vehicle speed similar to that in S8 and performs the traveling control similar to that in S9. In addition, the engine ECU 30 and the brake ECU 31 also perform the controls similar to that described above. The traveling control here is the acceleration control using the data of the acceleration direction.

In a case where the vehicle speed data is determined to be the data of the deceleration direction (that is, in a case where deceleration control using the data of the deceleration direction is performed) in S14, the driving support ECU 40 determines whether or not the type of deceleration target in front of the vehicle is a type of deceleration target of the traffic environment in which the constraint condition of the vehicle stopping is determined by the state of the vehicle (that is, when the vehicle stops at the stop position by the deceleration, whether or not the vehicle quickly stops is meaningful) (S5).

In a case where the type of deceleration target in front of the vehicle is determined to be a type of deceleration target of the traffic environment in which the constraint condition of the vehicle stopping is determined by the state of the vehicle (in a case of a traffic environment of temporary stop in which the vehicle can quickly start if the vehicle quickly stops at the stop position) in S5, the driving support ECU 40 changes the target of the control to the temporary stopping (S6), ends the deceleration control, and temporarily stops the travel control (S9). Here, the vehicle ends the deceleration control before reaching the stop position where the vehicle speed reaches zero km/h. At this time, the driving support ECU 40 generates the image information for display to end the deceleration control and transmits the display control signal to display 32. When receiving the display control signal, the display 32 displays the image of the display control signal. In addition, the driving support ECU 40 generates the voice information for outputting to end the deceleration control and transmits the voice control signal to the speaker 33. When receiving the voice control signal, the speaker 33 outputs the voice of the voice control signal. The driver receives the information by the display image of the display 32 or the voice output from the speaker 33, recognizes to end the deceleration control, and causes the vehicle to stop by the driver's own driving control. In this way, the vehicle temporarily stops at the stop position (for example, the position immediately before the stop line).

In a case where the type of deceleration target in front of the vehicle is determined to be a type of a traffic environment in which a constraint condition of the vehicle stopping is determined regardless of the state of the vehicle (a case where the vehicle cannot quickly start even when quickly stops at the stop position) in S5, the driving support ECU 40 sets the target position and the target vehicle speed similar to that in S8 using the data stored in the database 20 until the current position of the vehicle is in front of the stop position by a predetermined distance (for example, a few meters), and when the current position of the vehicle is within the predetermined distance from the stop position, acquires the highly accurate position information as the target position, and then, sets the target position and sets zero km/h as the target vehicle speed (changes the target of the control to the stopping) (S7). Then, the driving support ECU 40 performs the traveling control similar to that in S9 using the set target position and the target vehicle speed. The engine ECU 30 and the brake ECU 31 perform the control similar to that described above. By the traveling control, the vehicle stops at the stop position (for example, the position immediately before the predetermined stop line where the traffic signal exists (particularly, when the traffic signal is red)) with high accuracy.

In a case where the deceleration control ends and the traveling control is temporarily stopped, and in a case where the driver has an intention of performing the acceleration control after checking the safety, the driver performs the operation of causing the acceleration control to be performed using the driving support switch 13. When the operation is performed, the driving support ECU 40, similar to that described above, sets the target position and the target vehicle speed of the traveling control using the data stored in the database 20 as it is, and performs the control similar to that described above using the set target position and the target vehicle speed. The engine ECU 30 and the brake ECU 31 perform the control similar to that described above. By the control, the vehicle can start, accelerate after ensuring the safety.

In the driving support ECU 40, when the system in the vehicle is OFF, the processing ends, and when the system in the vehicle continues to be ON, the processing returns to S1 (S10).

In S1, even in a case where the travel data is determined to be stored, when the driver's intention for acceleration or deceleration is not indicated (that is, when the vehicle travels by the driving operation of the driver), the driving support ECU 40 stores the data such as the vehicle speed at each position in the database 20 similar to the processing in S2.

Particularly during the deceleration, when the type of deceleration target is a type of a traffic environment in which a constraint condition of the vehicle stopping is determined regardless of the state of the vehicle, if the traffic environment is changed to a situation where the vehicle can be accelerated, the driver determines that it is necessary to switch the traveling control from the deceleration control to the acceleration control. Therefore, the driver performs the operation for causing the acceleration control to be operated using the driving support switch 13. During the deceleration control (particularly, in a case where the current vehicle speed is equal to or higher than the threshold value, and the type of deceleration target is a type of a traffic environment in which a constraint condition of the vehicle stopping is determined regardless of the state of the vehicle and the traffic environment is changed to a situation that the vehicle can be accelerated), the driving support ECU 40 determines whether or not the acceleration request by the driver exists (whether or not the operation for causing the acceleration control to be operated is performed using the driving support switch 13) (S20). In a case where the acceleration request is determined not to exist in S20, the driving support ECU 40 continues to perform the deceleration control. In a case where the acceleration request is determined to exist in S20, driving support ECU 40 extracts the vehicle speed for acceleration and the position thereof from the travel data before and after the stop position stored in the database 20 while excluding the speed lower than the current vehicle speed, and sets the target position and the target vehicle speed (S21). Then, the driving support ECU 40 performs the control similar to that described above using the target position and the target vehicle speed (S22). The engine ECU 30 and the brake ECU 31 also perform the control similar to that described above. In this way, the vehicle shifts the deceleration to the acceleration, and accelerates such that the vehicle speed becomes the target vehicle speed.

As described above, the driving support apparatus 1 stores the vehicle speed in the database 20 in association with each position on the traveling route using the vehicle speed acquired when the vehicle travels by the driver performing the acceleration and deceleration operation. Then, in a case where the vehicle travels through each position on the traveling route stored in the database 20, the driving support apparatus 1 performs the traveling control based on the vehicle speed stored in association with each stored position. Particularly, in a case where the vehicle speed becomes lower than the threshold value during the deceleration control, the traveling control unit 43 ends the deceleration control. The threshold value is a low vehicle speed that the driver may recognize the position deviation with respect to the position of the vehicle by the traveling control. Since the deceleration control ends before the vehicle speed becomes low such that the driver may recognize the position deviation as above, it is possible to avoid the driver's recognition of the position deviation with respect to the position of the vehicle by the deceleration control. The driving support apparatus 1 can reduce the uncomfortable feeling of the driver caused by the position deviation by ending the deceleration control in a case where the vehicle speed becomes lower than the threshold value. Particularly, in the driving support apparatus 1, in a case of stopping the vehicle at the stop position, the deceleration control ends before the vehicle reaches the stop position and the vehicle stops by the driver's driving operation after ending of the deceleration control. Therefore, it is possible to prevent the uncomfortable feeling of the driver caused by the position deviation at the stop position. Besides the case of stopping the vehicle at the stop position where the position deviation is most easily recognized, in a case of decelerating the vehicle to an extremely low speed at the position where the opposite side can be foreseen in the blind corner with no center line, or in a case of decelerating the vehicle to an extremely low speed at the position where a cross road can be foreseen in an intersection or a T-junction with no stop line throughout the road, it is also possible to reduce the uncomfortable feeling of the driver caused by the position deviation.

The driving support apparatus 1 does not start the acceleration control until there exists an acceleration request by the driver after the ending of the deceleration control and the temporary stopping of the traveling control. Therefore, it is possible to improve the safety. In addition, even in a case where the vehicle speed is lower than the threshold value, the driving support apparatus 1 continues to perform the deceleration control until the vehicle stops in a case of the traffic environment in which a constraint condition of the vehicle stopping is determined regardless of the state of the vehicle, and therefore, it is possible to automatically stop the vehicle on the vehicle, and the burden to the driver can be decreased. Particularly, by acquiring the highly accurate position information regarding the stop position, the uncomfortable feeling of the driver caused by the position deviation can be reduced. In addition, the driving support apparatus 1, in a case where the acceleration request is received before the vehicle speed becomes lower than the threshold value during the deceleration control, performs the acceleration control while excluding the vehicle speed lower than the vehicle speed at the time of receiving the acceleration request among the vehicle speed data before and after the stop position stored in the database 20, and therefore, the driver who requests the acceleration does not feel uncomfortable.

The embodiment of the present invention is described as above; however, the present invention may be embodied in various forms without being limited to the above embodiment.

For example, in the present embodiment, the invention is applied to the driving support apparatus that performs the traveling control and the information providing. However, the invention may be applied to the driving support apparatus that performs only the traveling control. In addition, in the present embodiment, priority is given to the driver's driving operation and the traveling control is performed only when there is a driver's instruction. However, the traveling control may always be performed when there is a driver's instruction at the time of starting the driving. In addition, in the present embodiment, a plurality of ECUs perform the traveling control by issuing the instruction from the driving support ECU to the engine ECU and the brake ECU. However, only one ECU may perform the traveling control in which the driving support ECU directly controls each actuator of an engine or a brake. In addition, in the present embodiment, the driving source of the vehicle is an engine. However, other driving sources such as a motor or a hybrid of motor and engine may be usable. In addition, in the present embodiment, the brake is a hydraulic brake. However, other brakes such as a brake-by-wire may be used. In addition, in the present embodiment, the information is provided by the displaying on the display or the voice output by the speaker. However, any one of the display or the voice output may be used, or any other method of providing the information may be used.

In addition, in the present embodiment, the position and the vehicle speed data at the time of driving the vehicle by the driver's acceleration or deceleration control is stored, and the driving support is performed using the stored position and the vehicle speed data as it is. However, by providing a learning unit in the driving support ECU, the learning unit learns the position and the vehicle speed of the travel data, and the driving support may be performed using the learned position and the learned vehicle speed. The learning unit, for example, when the driver causes the vehicle to travel by the acceleration or the deceleration control, learns the vehicle speed at the position (the position where the variation in vehicle speed is small, for example, a variance of a plurality of vehicle speed data is calculated and the variance is lower than the threshold value) where the driver's behavior is stable in the same place. As the learned vehicle speed, an average value, a center value, a minimum value, a maximum value, or a percentile value of the plurality of vehicle speed data in the position where the variation in vehicle speed is small may be adapted. As a method of determining whether or not the variation in vehicle speed of the plurality of vehicle speeds is small, various methods may be adapted other than the method of determining whether or not the variance value of the plurality of vehicle speeds is smaller than the threshold value. For example, a predetermined range of vehicle speed is set, and then, in a case where the plurality of vehicle speeds are within the range of the predetermined vehicle speed, the variation of the vehicle speed is determined to be small.

In addition, in the present embodiment, even in a case where the vehicle speed is lower than the threshold value, the travel data is stored in the database. However, in a case where the vehicle speed is lower than the threshold value, the travel data may not be stored in the database.

In addition, in the present embodiment, a type of deceleration target is determined, and the deceleration control continues to be performed until the vehicle stops even in a case where the vehicle speed is lower than the threshold value according to the type of deceleration target. However, without determining the type of deceleration target, in a case where the vehicle speed is lower than the threshold value, the deceleration control may always end.

In addition, in the present embodiment, in a case where the deceleration control ends on the vehicle and the traveling control is temporarily stopped, if there is an acceleration request by the driver, the acceleration control starts. However, in a case where a safety system for preventing the collision with an obstacle is prepared on the vehicle in advance, if it is determined that the safety can be ensured by the safety system after the traveling control is temporarily stopped, the acceleration control may start even when there is no acceleration request by the driver.

What is claimed is:
1. A driving support apparatus that stores travel data while a driver causes a vehicle to travel by performing a driving operation and performs a driving support based on the stored travel data, the apparatus comprising:

a storage unit that stores a vehicle speed at each position on a traveling route using the vehicle speed acquired when the driver causes the vehicle to travel by performing an acceleration or deceleration operation;

an ECU programmed to:

acquire a current position of the vehicle; and perform a traveling control based on the vehicle speed at each position stored in the storage unit and the current position of the vehicle acquired by the ECU; and detect an acceleration request from the driver;

wherein, when the vehicle speed performed by the ECU becomes lower than a threshold value during deceleration performed by the ECU, the ECU ends the traveling control before the vehicle reaches a stop position where the vehicle speed stored in the storage unit becomes zero km/h and, when the acceleration request is detected by the ECU during the deceleration performed by the ECU and before the vehicle speed becomes lower than the threshold value, the ECU performs the traveling control at a vehicle speed no lower than the vehicle speed at the time the acceleration request was detected.

* * * * *